United States Patent [19]
de Roissart et al.

[11] 3,765,904
[45] Oct. 16, 1973

[54] METHODS OF PREPARING EXTRACTS FROM VEGETABLE PRODUCTS

[75] Inventors: Henri de Roissart, Grenoble; Conrad Johannes, Meylan, both of France

[73] Assignee: l'Air Liquide, Societe Anonyme Pour L'Etude Et L'Exploitation Des Procedes Georges Claude, Paris, France

[22] Filed: Feb. 11, 1971

[21] Appl. No.: 114,416

[30] Foreign Application Priority Data
Feb. 19, 1970 France .................... 7005941

[52] U.S. Cl. .................. 99/71, 99/75, 99/140 R
[51] Int. Cl. .................................... A23f 1/08
[58] Field of Search ............. 99/65, 71, 75, 140 R

[56] References Cited
UNITED STATES PATENTS
3,021,218  2/1962  Clinton et al. ............... 99/71
2,875,063  2/1959  Feldman et al. .............. 99/71
3,535,119  10/1970 Klein et al. .................. 99/71
1,367,726  2/1921  Trigg .......................... 99/71
2,306,061  12/1942 Johnston ...................... 99/71
2,680,687  6/1954  Lemonnier .................... 99/71
3,087,822  4/1963  Smith et al. ............... 99/71 X
3,223,533  12/1965 Kelly ....................... 99/71 X Primary Examiner—Frank W. Lutter
Assistant Examiner—William L. Mentlik
Attorney—Young & Thompson

[57] ABSTRACT

A method of recovering aromatic vapors released from vegetable products during comminution. A gaseous mixture of an easily condensable gas and a gas that is difficult to condense is used to sweep away aromatic vapors, the gaseous mixture then being cooled to condense said easily condensable gas and said aromatic vapors in a snow-like structure of said easily condensable gas.

10 Claims, 1 Drawing Figure

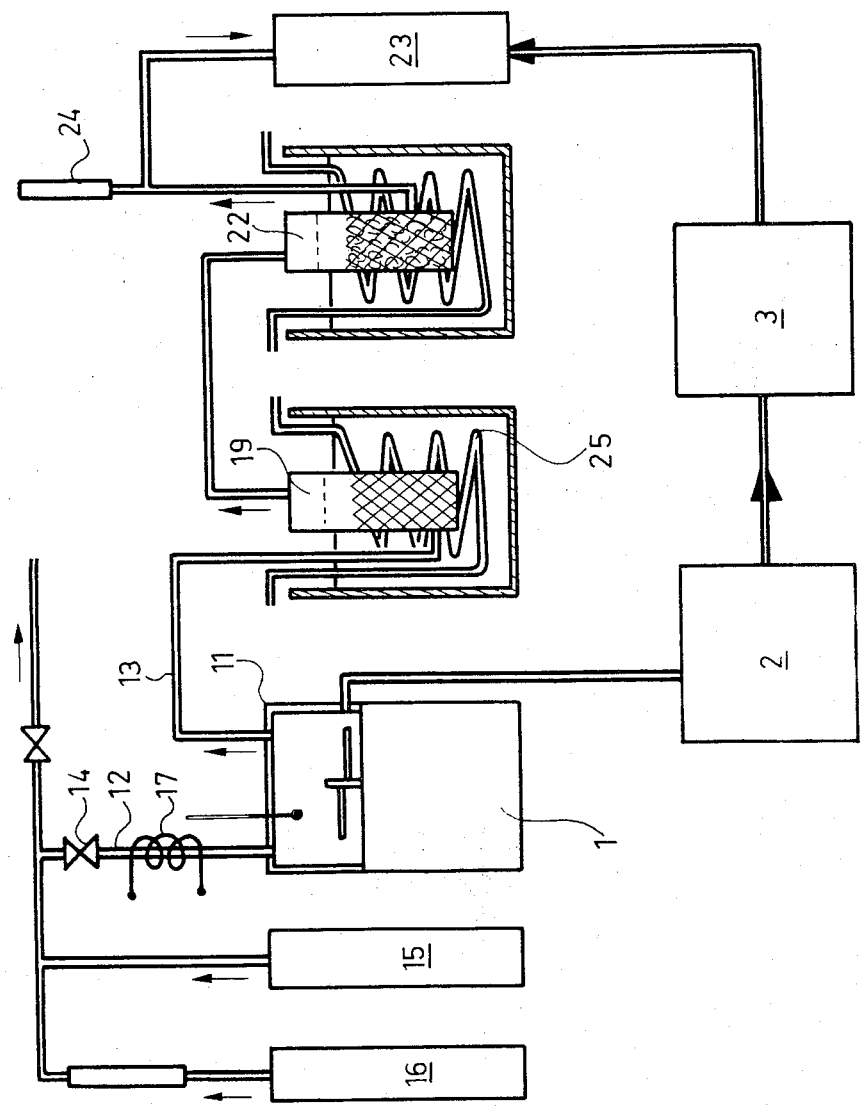

METHODS OF PREPARING EXTRACTS FROM VEGETABLE PRODUCTS

The present invention relates to the preparation of extracts from vegetable products, more particularly coffee.

Extracts from vegetable products are often in the form of powders, the production of which may include roasting of the product, grinding it into particles and extraction of the latter usually being carried out by aqueous means followed by dessication, more particularly by dessication under cryogenic conditions, or lyophilisation. In order to improve the taste properties of such a powdered extract, the aromas, which are usually very volatile, are put back into the extraction product before or after dessication by submitting the product, either before or after grinding, to an extraction treatment by a non-aqueous solvent, usually carbon dioxide gas in the liquid state or in the gaseous state which is then condensed, the liquid solution incorporating the aromas being mixed later in a liquid state or in the form of snow resulting from expansion or cooling, to the extract of the vegetable product before or after dessication, final dessication always being effected by subliming carbon dioxide gas.

The process thus enables a reconstitution of the product to be obtained and an almost perfect similarity to the actual product in the fresh state.

It is an object of the invention to improve the taste qualities of the extraction product by replacing the aromatic constituents therein which are released in the form of vapours at the time of grinding or milling and before the extraction operation. The known recovery processes which have been mentioned above are inoperative at this stage. Recovery by means of a liquid solution of carbon dioxide gas is of course incompatible with the dry grinding or milling process. If the method already referred to is chosen using a gaseous solution in carbon dioxide gas followed afterwards by condensation so as to obtain a liquid solution favourable to the restoration of the aromatic constituents in the extraction product, the operation becomes difficult to effect and is quite inefficient due, not only to the small concentration of aromatic constituents, but also to their great volatility which is not completely destroyed under the temperature and pressure conditions of a liquid solution of carbon dioxide gas.

Another object of the invention is a simplification of the process of recovering the aromas without operating under pressure which is necessary with the known processes and which requires complex equipment particularly for sealing.

More particularly, therefore, it can be stated that the invention relates to a process of recovering the aromatic constituents, such as aromatic vapours, which escape during the grinding or milling operation in the dry state but which may, if necessary, be applied at another stage of the extraction. It has been proposed to recover the aromatic vapours by a simple current of inert gas which is taken to a condenser where the aromatic vapours condense with the carbon dioxide given off by the product and which has been entrained therewith. This method of operating where the aromatic vapours condense on refrigerated surfaces is, however, inefficient. The method according to the invention, on the other hand, enables a great efficiency in trapping the aromas to be obtained.

Accordingly, the invention consists in a method of preparing extracts from vegetable products, more particularly coffee, with recovery of the aromatic constituents, in which the collection of the aromatic constituents is effected by a gaseous sweep current at the location of escape in the gaseous state of the said aromatic constituents, wherein said gaseous sweep current is formed by a mixture of an inert gas that is difficult to condense and a substantial proportion of a gas that is more easily condensable, and wherein the aromatic vapours are trapped over a snow-like structure formed in a condensing chamber by the said gas that is more easily condensable.

Advantageously, the snow-like condensing structure is formed for the aromatic vapours in proportion to the transfer of the aromatic vapours from the grinding or milling station to a condensing chamber initially devoid of a snow-like condensing structure. Experience shows in fact that the snowlike structure is that which is the most suitable for fixing aromatic vapours. In fact, it has great porosity, hence a very low load loss, a large surface area which favours the transfer of material and a great affinity to the aromas, i.e., good absorption qualities. It is understood that the results are all the better as the structure has a more developed porosity and the cooperation from this point of view of a non-condensable gas is crucial. Moreover, the use of a non-condensable gas mixed with the condensable gas intended to form the snow-like condensing structure has the appreciable advantage of limiting the spatial development of this structure while making use of a large flow transfer gas current. A snow-like structure which would be obtained from a transfer gas solely formed from a condensable gas would not only have a less favourable porosity but also would be needlessly large.

In order that the invention may be more clearly understood, reference will now be made to the accompanying drawing which shows diagrammatically apparatus for producing powdered coffee.

Referring now to the drawing, the apparatus shown comprises a grinding device or mill 1 wherein coffee beans are reduced to fine particles or granules, and aqueous treatment unit 2 wherein the coffee particles are treated to extract coffee solution, and a unit 3 for processing the coffee into powdered form proceeding to dehydration by cryogenic dessication or lyophilisation.

During this manufacturing cycle, aromatic vapours are released at the location of the grinding or milling station 1, although a large proportion of the aromatic vapours is recovered before or after milling as in known processes. As explained hereinabove, the present invention aims primarily to recover the aromatic vapours released at the dry grinding station.

To this end, the milling or grinding station 1 comprises a sealed chamber 11 having an inlet tube 12 and an outlet tube 13 for a gas, the conduit 12 being connected by a valve 14, on the one hand, to a carbon dioxide gas tank 15 and, on the other hand, to a gaseous nitrogen tank 16. An electrical heating resistor 17 enables the gas circulating in the input conduit 12 to be heated, if desired or necessary. The outlet tube 13 is connected to a first condenser 19 and to a second condenser 22, the output from which is taken to a chamber 23 for recovering aromatic vapours into which the dry particles of coffee extract obtained at the dessication or lyophilisation station 3, are fed. The condensers 19 and 22 have been shown as having a packing of a material easily permeable to gas but, in fact, better results are obtained with simple condensers having no packing. The condensers 19 and 22 may be in form of simple refrigerated cases.

A cooling coil 25 through which passes a cryogenic liquid, for example liquid nitrogen, is used for cooling the first condenser 19 to a temperature between $-5°C$ and $-40°C$ and preferably between $-5°C$ and $-10°C$, and the second condenser 22 to a temperature of at least $-50°C$, and preferably of the order of $-196°C$.

The operation of the apparatus is as follows:

Some liquid nitrogen is caused to circulate in the coil 25 until the condensers 19 and 22 have reached their normal operating temperature. Then the coffee is ground in the mill or grinding device 1 at the same time as substantially equal proportions of carbon dioxide gas and nitrogen in the gaseous state are admitted practically at ambient pressure: the water vapours and the aromatic vapours which are released during grinding are firstly carried along towards the condenser 19 having grids on which the water vapour and certain aromatic vapours heavy with disagreeable flavour condense and which are thus eliminated, then to the second condenser 22 wherein a snow-like structure of sublimed carbon dioxide gas forms gradually whilst the nitrogen is evacuated at 24. The snow-like structure of carbon dioxide gas is used as a trapping surface by condensation for the aromatic vapours. The recovery of the aromatic vapours condensed in the condenser 22 is effected very simply by stopping circulation of the refrigerating fluid around the condenser 22 followed by reheating and circulation of the resultant carbon dioxide gas and which incorporates the aromas in the chamber 23 into which the powdered coffee is fed. Instead of proceeding in this manner, the carbon dioxide snow can advantageously be removed from the condenser 22 and be mixed with the coffee powder either on a travelling belt or in a mixer. In this case, where the powder is at ambient temperature, the crystals of carbon dioxide gas incorporating aromas are sublimed leaving the traces of aromas in contact with each particle. This second process is preferable for it reduces to a minimum the entraining movement over the aromatic vapours of the carbon dioxide gas during escape thereof.

The gaseous mixture incorporating a gas easy to sublime and another gas difficult to condense can be produced from gases other than carbon dioxide and nitrogen, respectively. Carbon dioxide gas, whose sublimation temperature is $-78.5°C$ can be replaced by the hydrate of carbon dioxide gas ($CO_2-6H_2O$), if the aromatic vapours to be trapped condense at approximately $-10°C$ or even by simple water vapour for aromatic vapours condensing at a temperature of approximately $-5°C$, or even by argon.

In addition, the gas difficult to condense may be either nitrogen or helium or any other gas which is inactive with respect to aromas.

The proportion of gases easy to sublime and difficult to condense, respectively, is advantageously of the order of 50%-50%. In a general manner, the proportion of gas easily sublimable must not exceed 50 percent and it may be lower.

We claim:

1. A method of recovering aromatic vapors from vegetable products, comprising comminuting the vegetable products, forming a gaseous mixture of an easily condensable gas and a gas that is difficult to condense, said easily condensable gas being not more than about 50 percent of said mixture, thereafter sweeping away aromatic vapors that escape during comminution of the vegetable products with a stream of said gaseous mixture, and cooling said gaseous mixture to condense said easily condensable gas and said aromatic vapors in a snow-like structure of said easily condensable gas, said easily condensable gas being a member selected from the group consisting of carbon dioxide, hydrate of carbon dioxide, argon and water vapor, said gas difficult to condense being a member selected from the group consisting of nitrogen and helium.

2. A method as claimed in claim 1, in which said easily condensable gas is carbon dioxide.

3. A method as claimed in claim 1, in which said gas difficult to condense is nitrogen.

4. A method as claimed in claim 1, in which said easily condensable gas and said gas difficult to condense are present in said mixture in about equal volumes.

5. A method as claimed in claim 1, in which said easily condensable gas condenses at a temperature lower than water, and in which said condensation is conducted in two stages comprising a higher temperature stage in which water and undesirable vapors are condensed, and a subsequent lower temperature stage in which said easily condensable gas and desirable vapors are condensed.

6. A method as claimed in claim 5, in which said easily condensable gas is carbon dioxide.

7. A method as claimed in claim 6, in which said higher temperature stage has a temperature of $-5°$ to $-40°$ C.

8. A method as claimed in claim 6, in which said lower temperature stage has a temperature no higher than $-50°$ C.

9. A method as claimed in claim 1, and recovering said aromatic vapors by subliming said snow-like structure and passing the sublimed vapors through the comminuted vegetable products.

10. A method as claimed in claim 1, and recovering said vapors by intimately admixing said snow-like structure with said comminuted vegetable products.

* * * * *